(12) United States Patent
Miyatake et al.

(10) Patent No.: US 6,750,903 B1
(45) Date of Patent: Jun. 15, 2004

(54) SUPER HIGH RESOLUTION CAMERA

(75) Inventors: Takafumi Miyatake, Hachioji (JP); Akio Nagasaka, Kokubunji (JP); Takehiro Fujita, Mitaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/257,059

(22) Filed: Feb. 25, 1999

(30) Foreign Application Priority Data

Mar. 5, 1998 (JP) .......................... 10-053100

(51) Int. Cl.$^7$ .......................... H04N 5/225; H04N 5/262
(52) U.S. Cl. .................. 348/218.1; 348/240.2
(58) Field of Search .................. 348/218.1, 219.1, 348/240.99, 240.2; 358/540

(56) References Cited

U.S. PATENT DOCUMENTS

| | | | |
|---|---|---|---|
| 5,657,402 A | 8/1997 | Bender et al. | 382/284 |
| 5,889,553 A | * 3/1999 | Kino et al. | 348/218.1 |
| 5,907,353 A | * 5/1999 | Okauchi | 348/218.1 |

FOREIGN PATENT DOCUMENTS

| | | | |
|---|---|---|---|
| JP | 06-141228 | * 5/1994 | H04N/5/232 |
| WO | 97/25690 | 7/1997 | |

OTHER PUBLICATIONS

Kim et al; An Efficient Global Motion Characterization Method For Image Processing Applications, IEEE Transactions on Consumer Electronics, Vol 43, No. 4, Nov. 1997, pp. 1010–1017.*

Teodosio et al, "Sallient Video Stills: Content and Context Preserved," ACM Multimedia 93, pp. 39–46.

Hataizumi et al, "A Study of Alignment for Sprite Producing," IE97–81 (1997), pp. 19–24. (Abstract).

* cited by examiner

*Primary Examiner*—Andrew Christensen
*Assistant Examiner*—Tia M. Harris
(74) *Attorney, Agent, or Firm*—Mattingly, Stanger & Malur, P.C.

(57) ABSTRACT

A digital camera has an image sensor, and an optical system for focusing a scene on the image sensor. A zooming system is used for changing a zoom rate of the scene that is focused on the image sensor. By operating the zooming system during the recording of a series of images, each of the images has a different zoom rate and therefore a different level of detail and field of view. The images are combined to form one still image of super high resolution. The zoom rate between images is detected by using horizontal and vertical pixel intensity value projection distributions in both forward and backward prediction methods. Horizontal and vertical candidate projection distributions that are correlated to a range of possible zoom rates are compared with the horizontal and vertical projection distributions of the former and current images being processed to determine a least error match that is selected as the zoom rate between the adjacent images. Using the image to image zoom rate, a scaling factor is determined that is used for scaling each current image before overwriting the current image over the former images previously written to the image buffer. In this way, the detail of each image in the series is written to the image buffer and a super high resolution, wide angle still image is formed that can be stored and displayed.

20 Claims, 12 Drawing Sheets

SUPER HIGH RESOLUTION CAMERA

FIELD OF THE INVENTION

The invention relates to a digital camera that processes serial images to obtain a wide angle still image with high resolution. In particular, a super high resolution digital camera produces a wide angle still image with high resolution from images input by a zooming operation.

BACKGROUND OF THE INVENTION

For photography and related uses, many types of digital cameras have been sold in recent years. For achieving the objects of portability, functionality, or picture quality, various technical features have been adopted. Since the photographed image is digital, the image can be directly input into a computer, transmitted between computers and published, for example on the homepage of an Internet site or with a printer. Therefore, the demand for digital cameras has been growing quickly. However, the picture quality of present digital cameras is greatly inferior to that of conventional photographic film (silver salt) cameras. The resolution (typically 320 pixels 240 pixels) of the present average digital camera limits the ability of a user to enlarge the angle of view of the captured image.

Therefore, a need exists for a still image digital camera which provides a high resolution image even when a wide angle photograph is sought.

In salient Video Stills: Content and Context Preserved, ACM Multimedia 93 pp.39–46 written by Laure Tedosio et al, a method for obtaining an image with high resolution by using several conventional images is disclosed. This camera uses an affine transformation as a model for the camera's operation, and calculates 6 parameters from a group of local motion vectors between continuous images and synthesizes one wide angle image with high resolution from the plural images.

On the other hand, in the field of coding images, "A Study of alignment for sprite producing" (IE97-81(1997) pp.19–24) written by Hataizumi et al is known which discloses a method for generating a wide angle still image known as "sprite". This method uses Helmert's transformation as a model of the camera's operation, and calculates a pan, a zoom and a rotation parameter of the camera, and synthesizes one wide angle image from the plural images using these parameters. Likewise with the aforementioned first method, each parameter is calculated from the group of local motion vectors between continuous images.

SUMMARY OF THE INVENTION

Generating a digital still image with high resolution in a prior art digital camera requires the calculation of local motion vectors between (continuous or serial) images. In order to calculate a motion vector, a search process is executed by block matching of blocks of a size of 16×16 pixels. As a result, the block matching needs to be calculated for hundreds of blocks in the image. Therefore, there is a problem with increasing the image resolution because of the corresponding requirement of greatly increasing the quantity of calculation.

Furthermore, since the camera operation related parameters are estimated based on local motion vectors, for the case where a moving object exists in the image, there is a problem that the moving image causes an error in the resolution of the image. Therefore, it is difficult to generate an image with high resolution by applying conventional methods to a digital camera. Accordingly, in the prior art, a practical problem exists with the detection of camera operation related parameters in real time in order to make the detection performance quick and efficient.

It is an object of the present invention, therefore, to provide a digital camera which generates a wide angle still picture with high resolution similar to that obtained by conventional wide angle photography at a low cost, and in real time from a series of input images, preferably input by recording a scene with the camera.

The camera of the invention receives a series of input images, preferably by capturing the input images with an image sensing system for photographing an arbitrary scene, such as a moving or dynamic image. For recording a series of images, the camera has an operation input switch for starting and ending the recording of a scene, during which the camera's zoom function is operated to either zoom in for enlarging the image (correspondingly reducing the angle of view) of the scene being shot or to zoom out for reducing the image (correspondingly widening the angle of view) of the scene.

The camera also preferably has a display for displaying the high resolution image as it is being recorded and after processing. Preferably, the display is made a part of the camera body for a user to view the image during recording. Optionally, the image taken in by the view finder can be included as part of the display. Also, the display can show a graphical user interface that shows image information related to the zooming operation displayed at the same time on the display with the images being recorded.

As part of the processing of the series of images, a zoom rate detector detects a zoom rate between images, preferably images photographed by the image sensing system of the camera or otherwise input to the camera from storage, for example. The zoom rate detected between each of the images is related to a scaling factor that is used to enlarge or reduce sequential images in the series during the processing of the images which are then stored in an image buffer to obtain the super high resolution image.

For example, an initial image of a series of images is written to the image buffer. Then each succeeding next image is multiplied by the appropriate scaling factor determined in relation to the detected zoom rate and overwritten on the image buffer to provide for greater image detail of that part of the scene which is captured by each next image of the series. This process is repeated in real time during the recording operation of the camera, with each next image of the series (for each sequential image of the series or for every other image thereof, etc.), being scaled up or scaled down according to the zoom rate detected by the zoom rate detector and then being overwritten on the image buffer.

During processing, as the series of images is being recorded and overwritten on the image buffer, preferably the resultant image is displayed on the display in real time. After the recording of the series of images is concluded, or otherwise input to the camera, and all of the images to be processed have been appropriately scaled and overwritten on the image buffer, the resultant image in the image buffer is the super high resolution image. The super high resolution image can be displayed and stored as a typical digital image in the camera in an image memory and otherwise output for storage in an external memory or display.

DETAILED DESCRIPTION OF THE PREFERRED EMBODIMENTS

Figure 1:
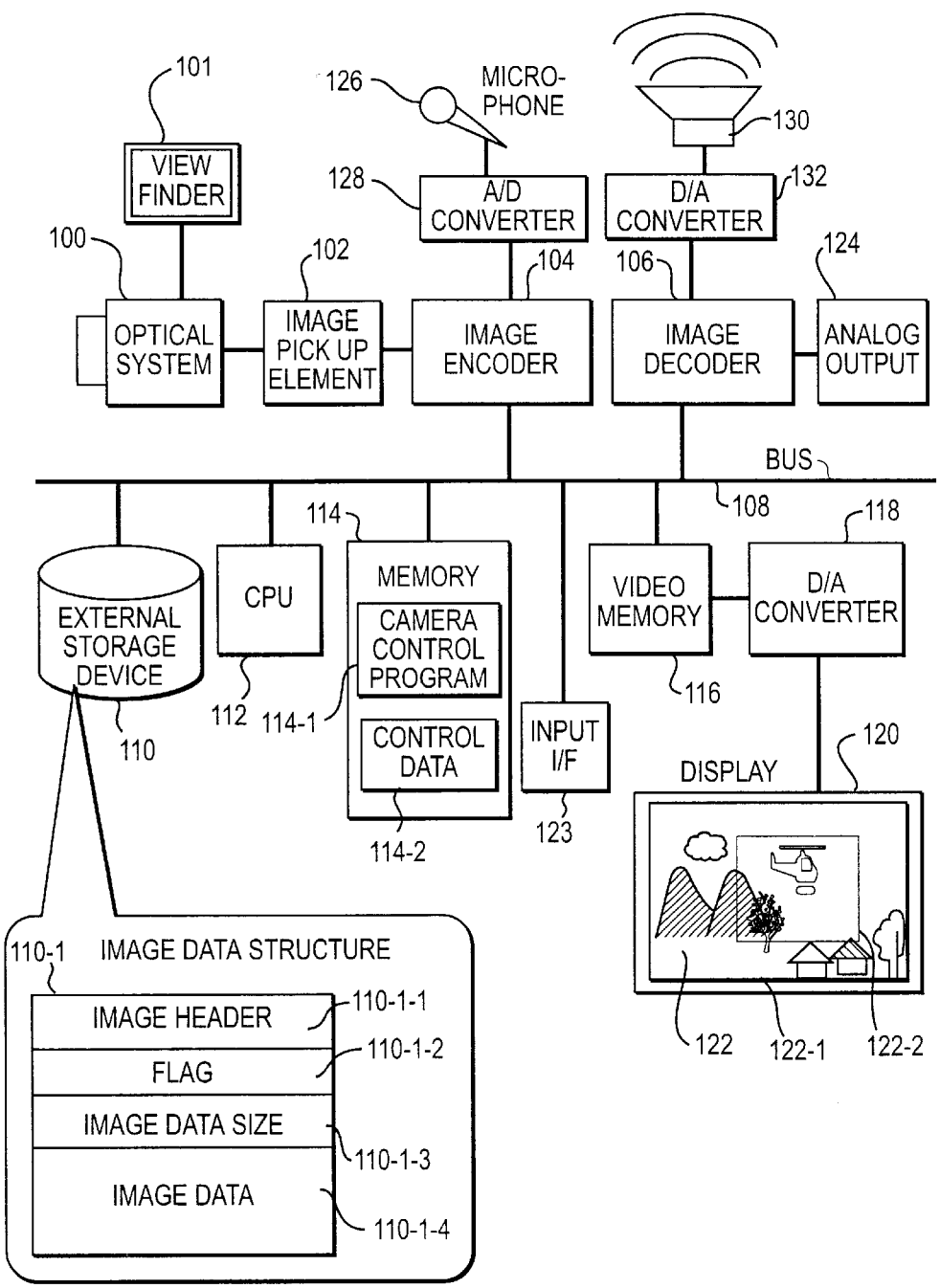
FIG. 1 shows an example of a camera system of the invention.

FIG. 1 shows a digital camera system according to the invention that processes serial images preferably input while recording the images during a zooming operation to obtain a wide angle still image with super high resolution.

The present application is copending with U.S. application Ser. No. 09/093,782, issued as U.S. Pat. No. 6,466,262, filed Jun. 9, 1998 entitled Digital Wide Camera, the disclosure of which is hereby incorporated by reference.

The digital camera of the invention is functionally divided into two parts and may be formed in a single camera body or housing, or may be divided into two or more parts. If divided, the optical, audio and image sensing parts of the camera and an image display, as well as the image compression and decompression coding circuits, can be separate from the image processing part of the camera which processes the series of images to obtain the super high resolution image, optionally stores the serial images as well as optionally displays the images. The images can be input by a recording operation of the camera for real time processing during the recording or be input from storage, optionally external of the camera.

Figure 2A:
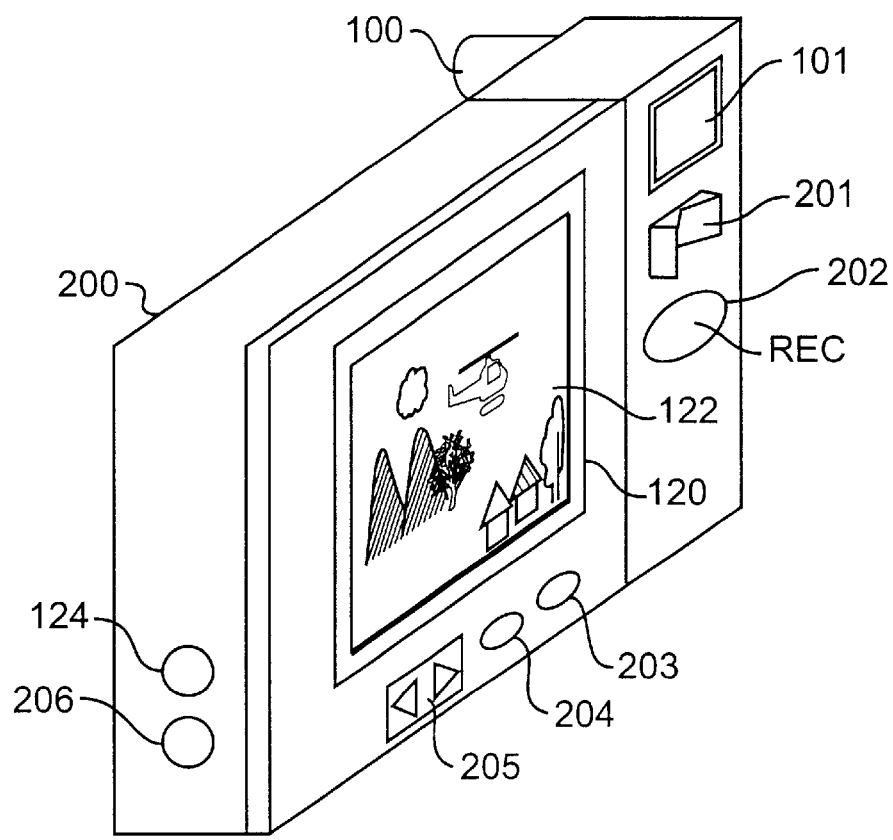
FIG. 2A shows an example of the arrangement of the camera body of the invention.
Figure 2B:
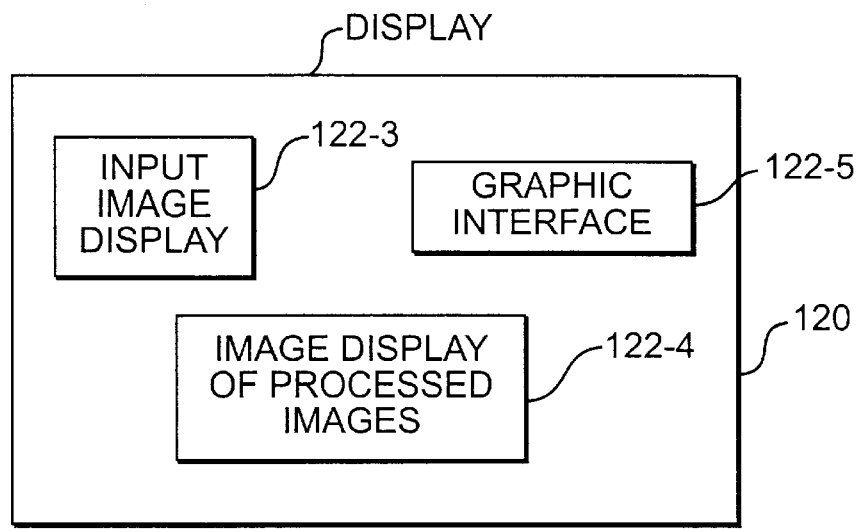
FIG. 2B is an example of a camera display 120 shown in FIG. 2A, according to an alternative embodiment of the invention.
Figure 2C:
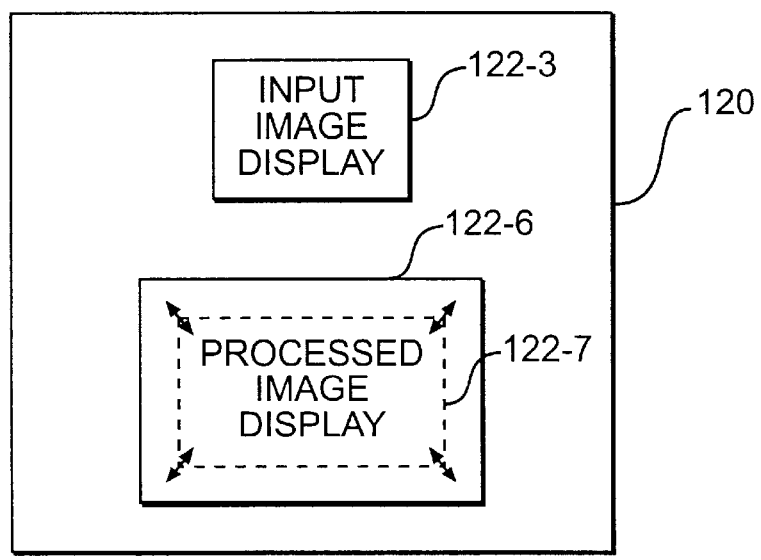
FIG. 2C is another alternative embodiment of the display 120 shown in FIG. 2A.

As shown in FIG. 1, a bus 108 schematically depicts a connection between the components of the camera. Above the bus 108 are shown components that are generally equivalent to the components found in a conventional MPEG camera, such as the MPEG-10 digital disk camera of Hitachi, Ltd. Below the bus 108 are shown the components typically found in a digital computer, and in particular, according to one embodiment of the invention, a notebook computer. Note, however, that an image display 120 for displaying a processed sequence of images as a super high resolution image 122 is shown below bus 108, but in a preferred embodiment, as shown in FIGS. 2A–2C, the image display is formed as part of the camera body so that, preferably, formation of the image as the camera is processing the serial images can be observed by the user.

In particular, the digital camera includes an optical system 100 including a view finder 101, which may be an optical view finder. Alternatively, the view normally provided by the view finder 101 may be provided as an image on the display 120 that is displayed along with the super high resolution image 122 or as an alternative thereto. Of course, display 120 can also display other suitable information, shown for example in FIGS. 2B and 2C, to be explained in greater detail hereinafter.

In more detail with reference to FIG. 1, optical system 100 is used for focusing and framing the view of a scene or person for capturing the view on an image sensing device (CCD) 102 under control of the user who observes the scene or person through the optical system finder 101. The optical system includes a magnification adjusting mechanism for operating the zoom function. The operation data such as the zoom (magnification), etc. is transmitted to a CPU 112 that performs functions to be described later.

In general, when a scene is shot using an MPEG camera, the images are converted to electric signals through photoelectric conversion by image sensing device 102. An image compression encoder 104 receives the electric signals representing an image from the image sensing device 102, which reduces the amount of data by using an image compression method such as that of the MPEG standard. The images can be stored in an external storage device 110, which can either be part of the camera, for example a flash memory or a hard disk drive, or can be external to the camera, for example a memory storage device in a computer.

The images are taken in at a frequency of about 30 times per second (30 frames per second) so that they are stored as consecutive images, each having a potentially different frame to frame zoom rate. According to the preferred embodiment of the invention, the series of images are processed by enlarging or reducing the captured image in accordance with a scaling factor determined on the basis of the frame to frame zoom rate detected between adjacent frames or images of the series to be processed. After scaling an image, the image is stored or preferably overwritten onto an image buffer (super high resolution image buffer). The storing starts with writing an initial image to the image buffer based on a determination of whether the series of images represents a zoom in or zoom out operation of the camera during recording. Then, each succeeding image of the series is scaled according to the zoom rate with respect to the previous image and then written over the previous image in the high resolution image buffer.

Although each image or frame can be used at this rate while still accomplishing real time processing, every other or every third (and so on) frame at this rate can alternatively be selected as the series of images to be processed. Also, a higher rate of images can be captured by the recording system in the event that different standards, such as MPEG 2, for example, are adopted for use. The rate at which images are selected to make up a series of images is determined, according to the present invention, so that the detail of the resultant image is satisfactorily maintained.

When a still image is to be captured, i.e. an image without increased resolution achieved by processing a series of images using the zoom function, only one image at the moment when a shutter is pressed has to be stored. Thus, the camera can function as a standard digital camera.

Sound can be captured along with the recorded scene with a microphone 126 and an A/D converter 128. The sound is preferably stored in the external storage device 110 and correlated to the input images.

Preferably, the external storage device 110 is a large-capacity storage device such as a hard disk or the like that provides a non-volatile storage area for digital data. The hard disk may be of the type which can be detached from the main body like a hard disk card of the PCMCIA type or it may be of the type in which only the storage medium is detached, like a magneto-optical disk.

The CPU 112 executes the control operation for starting/stopping the recording operation and further executes the software program for realizing the functions which will be described in the present invention. A program, such as a camera control program 114-1, resides in a memory 114, in which are also stored values of variables and image data (data 114-2, shown in greater detail in FIG. 9) that are necessary for the execution of the program.

An image memory or video memory 116 stores a super high resolution image 122 to be displayed on a display 120, as digital data. A D/A converter 118 of a type which is generally called a RAMDAC successively reads the data written on the video memory 116, adjusts to the speed of the scanning lines, and draws an image on the display 120. When the data in the video memory 116 is updated, therefore, the updated content is readily reflected on the display 120. The image being shot and input to the image compression encoder 104 can also be directly written in the video memory 116 by bypassing the image compression function.

The image decompression decoder 106 decompresses the compressed dynamic image data stored in the external storage device 110 and outputs it to the video memory 116 as an image. An analog output 124 outputs the decompressed image after converting it into analog video signals of the type widely used for TV receivers of, e.g., the NTSC system. These outputs can be recorded by connecting the camera to a video apparatus such as that of a VHS type that is now widely used. The audio data that is recorded can be output through an audio D/A converter 132 and a loudspeaker 130 in synchronism with the decompression of the image. An input I/F 123 can be used for the control of switches such as a record button and a replay button, or it can accommodate a data input device such as a transparent touch panel attached to the surface of the display 120. The input data are transmitted to the CPU 112 and are suitably processed.

In general, for the digital camera of this embodiment, a sequence of images that are shot while operating the zoom in/zoom out function are processed to obtain a super high resolution image. First, the images that are shot are fed to the memory 114-2 according to a camera control program stored in the memory 114-1 during the shooting, and then are successively processed to display a high resolution image 122, which during processing as shown in FIG. 1, includes a wide angle image 122-1 of the just processed image and a current (zoomed-in) image 122-2 on the display 120. After the shooting is finished, the wide image is stored as an image data structure 110-1 in the external storage device 110.

With reference to FIG. 1, each image data structure includes an image header 110-1-1 that has data necessary for the decompression, such as the image compression system used, and the vertical and lateral sizes of the image. A flag 110-1-2 which represents whether the image is valid or invalid, is used at the time of simply editing the images. The image data size 110-1-3, which represents the number of bytes of the succeeding image data 110-1-4, is also stored. Therefore it is possible to calculate where the compressed image data are recorded in accordance with the kind of the image or the size of the image.

The display 120 is a device for displaying an image, and may be, for example, a small CRT or a plasma display or may be a display device of the liquid crystal type. In addition to displaying the image stored in the video memory 116, additional images or alternative images can be displayed on display 120, such as the view from the optical system finder 101.

FIG. 2A illustrates the appearance a digital wide camera body according to a preferred embodiment of the invention. In this embodiment, a camera body 200 has the aforementioned lens unit (optical system) 100, finder unit for the optical system 101, flat panel display 120, and buttons 201 to 205. The image shot by the lens unit 100 can be confirmed through the finder unit 101 and can be displayed on the display 120.

Of the buttons 201–205, an operation switch 201 is for zoom control, which is a rocker button switch in which the zoom operation is continuously performed when the switch is depressed toward one side or the other for increasing or decreasing the magnification of the viewed scene. The recording is accomplished upon depressing the record button 202; i.e., the recording starts when it is depressed once and ends when it is depressed again during recording (or only while it is being held down, etc.). In addition to recording the images shot during the recording period, when the user operates the camera to shoot a scene while operating the zoom function, a high resolution wide image is formed in real time by processing the image sequence, and is displayed on the display 120. This makes it possible to quickly confirm the processed image and to observe potential failure in the processing of a wide image.

When the playback of the stored images is requested by operating a button, a list and the individual images are displayed on the screen 120. Further, for the camera of this embodiment, general-purpose buttons 203 and 204 are also provided for enabling various operations of the camera. Still further, a scroll button 205 is provided for selecting an image to be displayed and for scrolling through the stored images to be displayed on the display 120.

The recorded images can be output through an analog output 124 after being converted into analog video signals that are widely used for TV receivers. Furthermore, the recorded data can be transferred to a general computer through a computer interface 206. Thus, the digital wide camera of the present invention can be effective as a tool for collecting a variety of digital based information.

Although the present embodiment contemplates that the images of a zoom sequence are input through the lens by the operation of the camera, they may be input to auxiliary storage 110 from another source. Then, such a sequence of images can be read from the auxiliary storage separately and processed to generate the super high resolution image.

FIGS. 2B and 2C show alternative embodiments of the arrangement of display 120, contemplated by the present invention. In FIG. 2B, the display 120 includes an input image display portion 122-3 that shows the image directly from the view finder 100 and further shows the super high resolution image as it is being processed in display area 122-4. Also, a graphical interface display area 122-5 is provided for displaying graphical information relating to the degree of zoom for the current image relative to the other images of the sequence being processed, preferably in real time as explained with reference to FIGS. 7A and 7B.

The arrangement of the display 120 in the other alternative embodiment shown in FIG. 2C is similar to the FIG. 2B embodiment in that the display includes input image display portion 122-3 that shows the image directly from the view finder 100. On the other hand, the graphical user interface display area 122-6 shown in this figure is different. In particular, the change in zoom magnification is shown by changing the size of a border 122-7 displayed as part of the high resolution image, wherein the border 122-7 is around the periphery of the current image in the sequence of images being processed, and contracts or expands as shown by the arrows, depending on the direction of the zoom in the sequence. In a preferred embodiment, the border is displayed by showing a line of a particular color as the border 122-7, such as a highlighting color like yellow.

Figure 3:
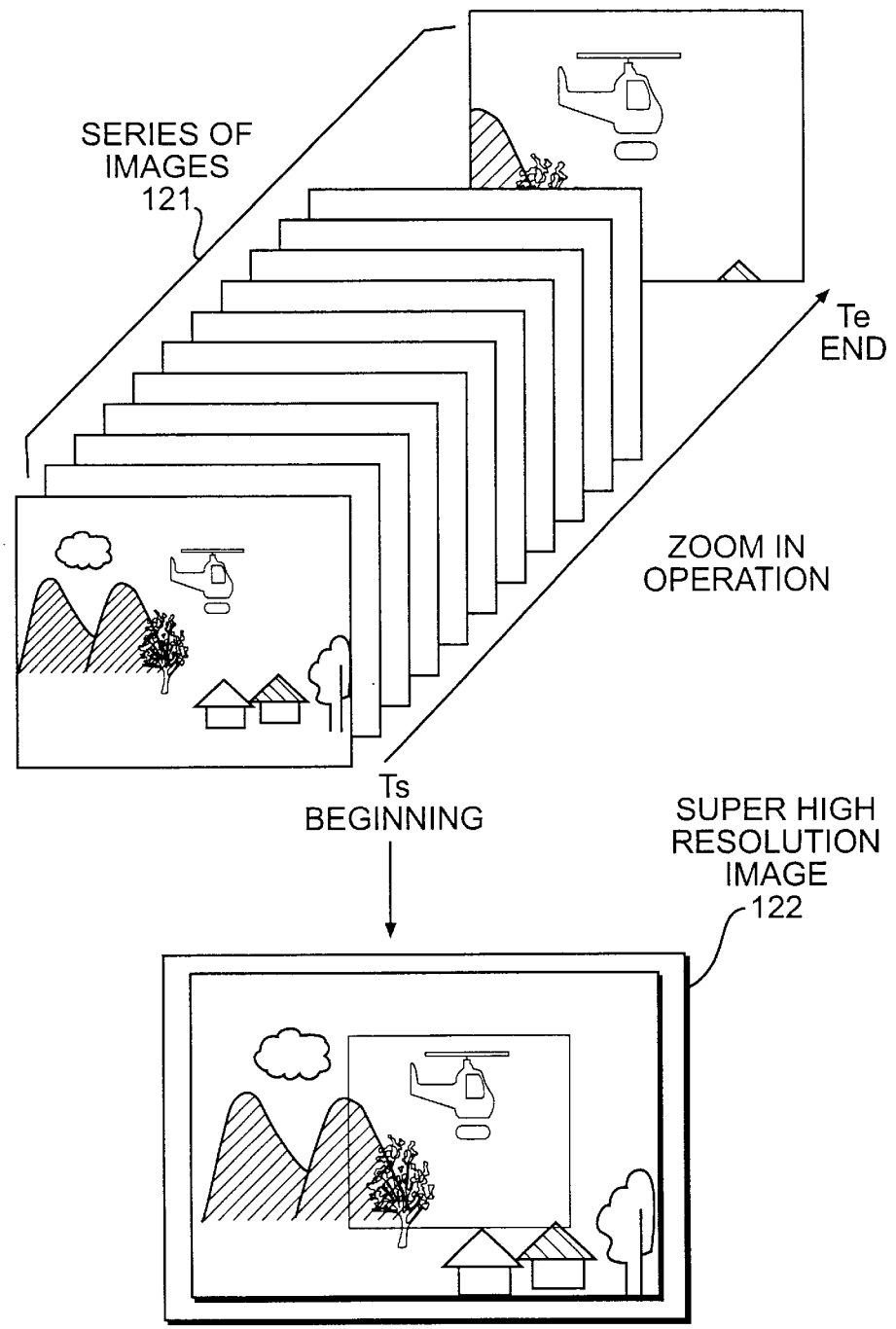
FIG. 3 is a diagram schematically illustrating the process of forming a still image with super high resolution according to the present invention.
Figure 4:
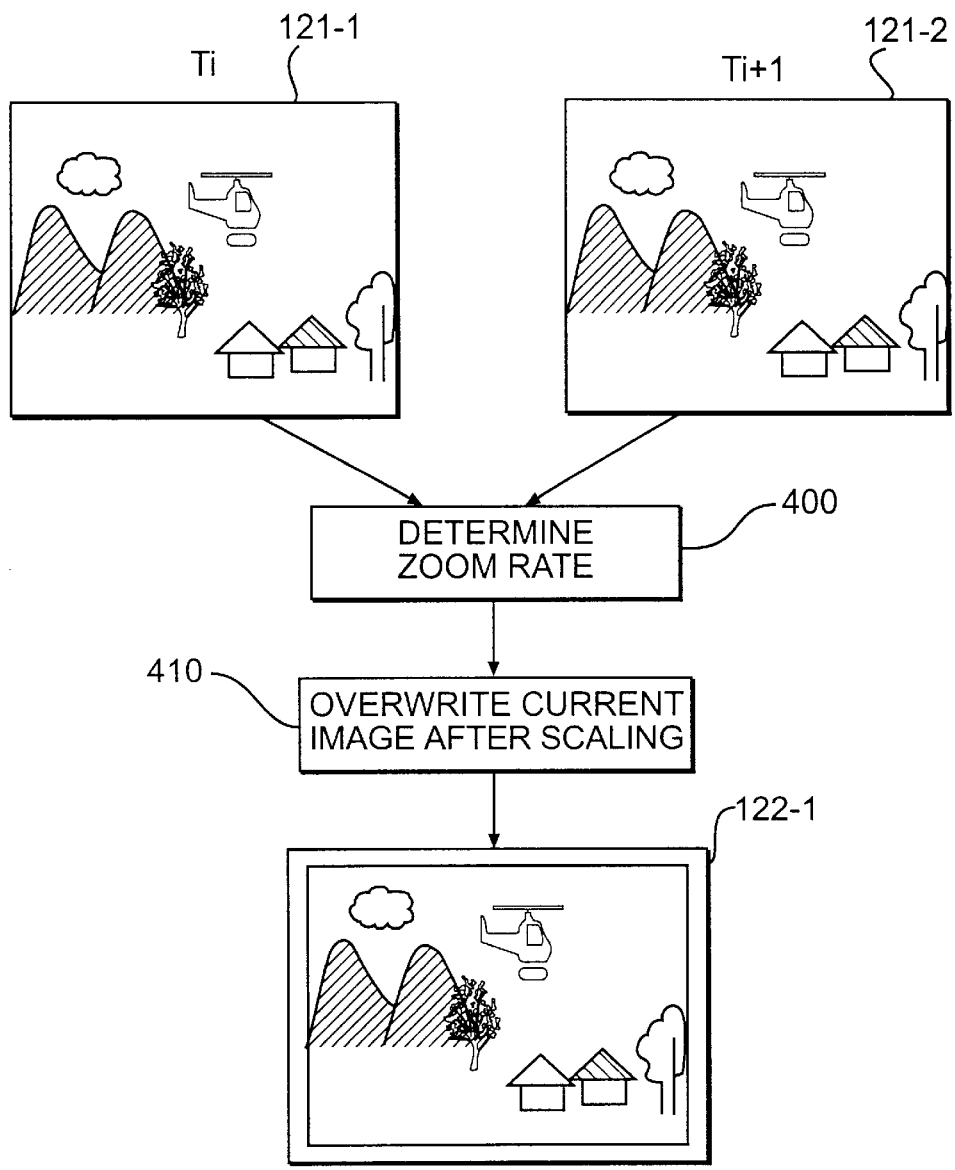
FIG. 4 is a diagram illustrating the combining of serial images according to the present invention.

FIG. 3 is a diagram illustrating the steps for forming a super high resolution still image which will now be described, also with reference to FIG. 4. Once the record button 202 is depressed, a sequence of pictures or images (frames) are created beginning with a first image 121-1 of the sequence at time Ts and continuing until the record button 202 is depressed again at time Te. The picture sequence 121 that is shown in FIG. 3 is obtained when the pictures are taken while operating the camera's zoom in function, in this example. The zoom function causes the scene in the images of the sequence to be reduced or enlarged in small incremental changes, depending on the actual frame to frame zoom rate in operation.

That is, a wide view image of mountains, trees, houses and a helicopter is shot at the start of recording the sequence at Ts and an image of just the helicopter, one tree and part of the mountains is shot at the end of recording the sequence at Te. During this zoom-in sequence, the part of the wide view captured by the image increases in detail as a result of the zoom in function, but the angle of view decreases.

Figure 5:
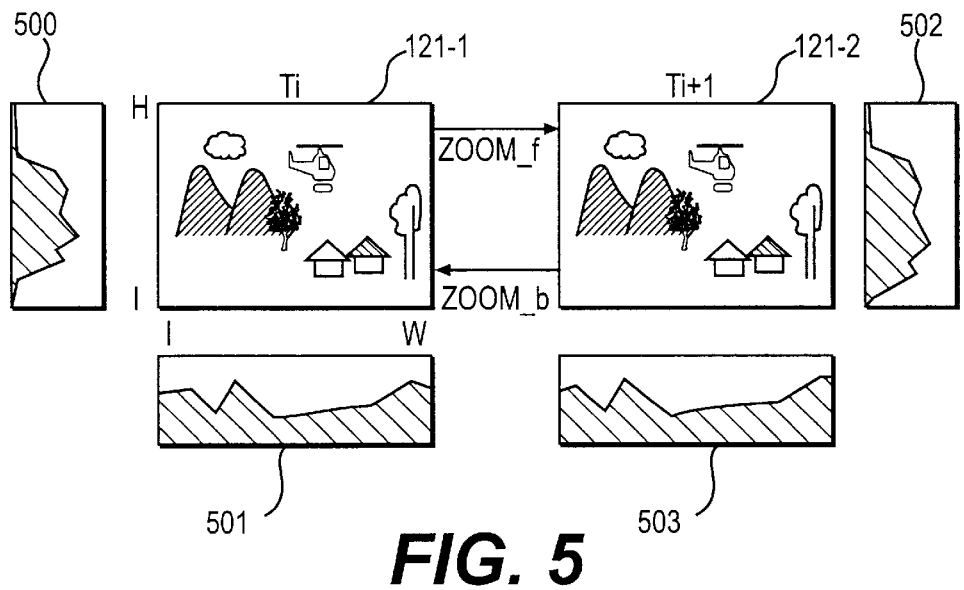
FIG. 5 is a diagram showing zoom rate detection between two sequential images.

Preferably, to capture the sequence of images, the camera is mounted on a tripod or other fixed support so that during the zoom function there is substantially little shifting of the center point of each respective image in the sequence. For example, the center point is fixed at the point of the intersection of W/2, H/2 for each image, wherein the images have a height H and a width W, as shown in FIG. 5.

However, the rate of zoom in or zoom out is rarely constant, so the frame to frame zoom rate fluctuates between images in the sequence. Even under such a situation, by scaling the images according to the zoom rate between each image processed in a series of images, a super high resolution image 122 can be obtained. As shown in FIG. 4, the zoom rates between images are determined (400) by doing a check based on an image feature quantity between adjacent (in time) images 121-1 and 121-2. The latest image, scaled according to the determined zoom rate, is over written on the previously processed series of images stored in a super high resolution image buffer forming the super high resolution image 122-1 (step 410) in real time until the end of processing of the series of images after which the final super high resolution image 122 is obtained.

Although a process of generating a super high resolution image when the series of images are captured in a zoom-in operation has been explained herein, the process is the same for the zoom out operation. In the case of zoom out, by scaling the latest image, only the area that extends into an area beyond that of the former image is over written on the super high resolution image buffer to obtain the super high resolution image 122-1 (410) for efficiency.

Here, scaling of an image can be simply performed by a method of expanding or contracting an image according to a scale, or by applying a method of linear interpolation by referring to 4 pixels in a circumference. While the method of linear interpolation has a problem due to the increase by 4 times of the calculation quantity, it can make the jag of an image un-conspicuous even when a super high resolution image is expanded and displayed. When the generated super high resolution image is displayed in real time, it is desirable that the size of the first image at the time of the start of recording is known in advance according to the lens magnification.

In a preferred embodiment of the invention, the direction of the zoom function, i.e. zoom in or zoom out, operated during the recording of the images is determined first. The first image of a series of images to be processed is considered to be one half of the maximum magnification or zoom rate. Then, this first image is compared with the second image of the series to determine whether the operator is zooming in or zooming out during recording. If the operator is zooming in during recording, then the first image is scaled and stored at the maximum size of the super high resolution image buffer 114-2-2 (FIG. 9) using the appropriate scaling factor as associated with the camera's maximum zoom rate. Then, the next image is scaled (enlarged or reduced in accordance with the detection of the frame to frame zoom rate) and is overwritten on the image buffer 114-2-2 with a center point matching between the two images. The center point is assumed to be fixed for each frame or image at W/2, H/2 according to this embodiment of the invention. The second and each subsequent image is then multiplied by a scaling factor, which is determined on the basis of the image to image (frame to frame) zoom rate for each subsequent image with respect to the preceding image and followed by overwriting the image on the image buffer for the high resolution image, as explained in greater detail herein.

For the case of zoom in, the center part of the image stored in the image buffer 114-2-2 is overwritten each time by the next succeeding image, which has been multiplied by a decreasing scaling factor or zoom rate. For example, if the maximum zoom rate is 10 for the recording system and the operator is zooming in on the scene during recording, the first image is written to the video buffer using a scaling factor of 10, which is incrementally reduced for each succeeding image according to the actual frame to frame (image to image) zoom rate, from 10 for the first image to a last image in the series having a lowest possible scaling factor of 1.0. The scaling factors are not preset since each is determined in real time on the basis of the actual frame to frame zoom rate, which is determined within a tolerance of about 0.001 to 0.005 and preferably within a tolerance of about 0.001.

As another consideration, since the center portion of the super high resolution image buffer is overwritten for each image, it is quicker to overwrite only a peripheral edge portion of each succeeding image, rather than the entire image. To perform this overwriting function according to the preferred embodiment of the invention, a variable sized center portion of each succeeding image is masked to alleviate the need for overwriting the center most portion of the image to the center portion of the image buffer until necessary. This causes the processing speed to increase significantly, enabling the processing to be performed in real time during the recording of the scene.

In performing the processing of the super high resolution image of the invention, it is necessary to know the appropriate scaling factor, which is related to the frame to frame or image to image zoom rate. An example of determining the appropriate scaling factor which is used for the scaling of an image before it is written to the image buffer will be explained in detail with reference to FIGS. 5 and 6.

FIG. 5 shows a principle of detecting the zoom rate. First, a horizontal projection distribution 500 and a vertical projection distribution 501 of image 121-1 at time Ti are created. Similarly, horizontal projection distribution 502 and vertical projection distribution 503 of image 121-2 at time Ti+1 is created.

By checking the difference between vertical projection distributions 501 and 503, the zoom rate is predicted, i.e. zoom in or zoom out. This is performed by checking both a backward prediction (from Ti+1 to Ti) and a forward prediction (from Ti to Ti+1). The result of the prediction that has the fewest errors, i.e. the candidate projection distribution that produces the closest match, becomes the resultant candidate projection distribution from which the frame to frame zoom rate is detected, as explained in greater detail hereinafter with respect to FIG. 6.

In general, in performing the forward prediction zoom rate detection, several temporary zoom rates are predicted from the vertical projection distribution 501 of image 121-1 at time Ti, and a temporary vertical projection distribution for each zoom rate is generated. Then, the temporary vertical projection distributions that are formed are checked for a match with vertical projection distribution 503 of image 121-2 at time Ti+1.

For backward prediction of the zoom rate, several temporary zoom rates are predicted from the vertical projection distribution 503 of images 121-2 at time Ti+1, and a temporary vertical projection distribution for each zoom rate is generated. Then, the temporary vertical projection distributions that are generated are checked for a match with vertical projection distribution 501 of image 121-1 at time Ti.

Since the fluctuation range of the zoom rate between adjacent images is limited, the temporary zoom rates are predicted to be within a set range. One of the temporary zoom rates is selected based on the nearest match of the temporary vertical projection distributions that are formed and the vertical projection distribution 503 (forward prediction). The nearest match is determined by mathematically considering which of the temporary vertical projection distributions when compared with the vertical projection distribution 503 has the least error due to a mismatch resulting from the comparison. As a check error between those two projection distributions, i.e. the difference error as a result of the checking or comparing, the sum of the absolute value of a difference between each elements is used or alternatively the average square error can be used. Accordingly, a sharp reduction in the calculation quantity can be achieved.

Figure 6:
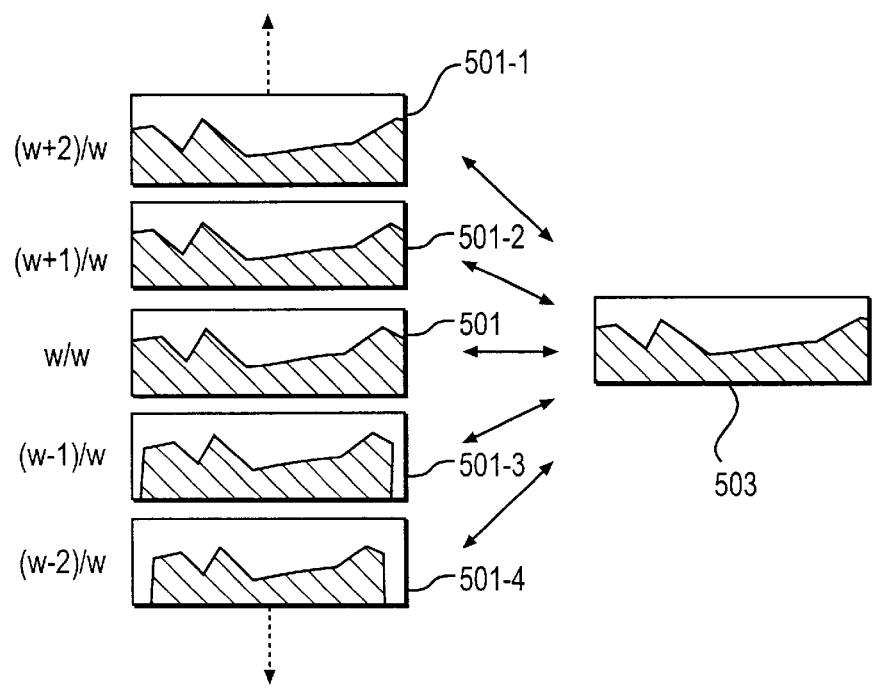
FIG. 6 is a diagram of a comparison made between a vertical projection distribution 503 obtained from an input image for matching with a candidate vertical projection distribution in the determination of a zoom rate.

FIG. 6 shows an example of using forward prediction in determining the frame to frame zoom rate using the vertical distribution of projection 503 taken from image 121-2. At first, several candidate vertical distribution projections 501-1 to 501-4, are generated for matching with vertical distribution projection 503. The candidate vertical distribution projection which matches vertical distribution projection 503 is used for determining the zoom rate, preferably within a tolerance of ±0.001 to ±0.003. If there is no best match once all the candidate projection distributions have been considered for both the forward and backward prediction models, a zoom rate of 1.0 is assumed.

As shown in FIG. 6, when the zoom rate is greater than 1.0, the width (W) of the pixels for an image 121-2 increases with respect to image 121-1. So, the candidate vertical distribution projections 501-2 and 501-1 are generated by assuming that the pixel width (W) increases. Similarly, the candidate vertical distribution projections 501-3 and 501-4 are generated for the case of the zoom rate decreasing to less than 1.0 in which case the pixel width (W) decreases. A candidate vertical distribution of projection 501 is provided for the case of a constant pixel width (W).

For accuracy in determining the zoom rate, the candidate vertical distribution projections that are to be matched to the vertical distribution projection 503 are generated by increasing or decreasing the pixel width (W) by units of 0.1 to 2.0 pixels, depending on the pixel width of the image. In the preferred embodiment, as shown, one pixel is used for expansion or contraction for each candidate for a practical maximum of 16 to 32 candidate vertical distribution projections. In the present embodiment, there is considered a maximum zoom rate of ((W±10)/W). However, only the candidates of (W±1)/W and (W±2)/W, 501-2 and 501-1, respectively, are shown for increasing zoom rate and only (W−1)/W and (W−2)/W, 501-3 and 501-4, respectively, are shown for the decreasing zoom rate, for purposes of illustrating the concept of the preferred embodiment of the invention.

Once a candidate vertical distribution of projection is determined to match (when a best mathematical comparison results in the least error for one of the candidates) the vertical distribution of projection 503, then the corresponding zoom rate ((W±n)/W) for the candidate is selected as the zoom rate where n=number of pixels that width (W) has increased (a positive number) or decreased (a negative number) due to the enlargement or reduction between images resulting from the zoom function. The preferred embodiment of determining the image to image zoom rate is described in detail with reference to FIGS. 10–12. Of course, there is the case where the zoom function has not been used between images 121-1 and 121-2, in which case the candidate vertical distribution of projection 501, which represents a zoom rate of 1.0 will be determined as the candidate vertical distribution of projection that matches 503. This would indicate a still picture (still meaning no zoom between images 121-1 and 121-2) image 121-2.

Although only the comparison of vertical projection distributions is shown in FIG. 6, horizontal projection distributions are also compared and the nearest match selected in the same way. According to the preferred embodiment of the invention, both the vertical and horizontal projection distributions are compared to ensure accurate determination of the zoom rate.

Further, although FIG. 6 only shows the concept of forward prediction, preferably the zoom rate is also determined using backward prediction. In backward prediction, the candidate vertical distribution projections are generated based on the image 121-2 at time Ti+1 for comparison with vertical distribution of projection 501. That is, the candidates are generated with iterations of a zoom rate expressed by (W/(W±n)). By using both forward and backward prediction techniques with both horizontal and vertical distributions of projection, the zoom rate can be determined with high accuracy.

At the time of detecting the zoom rate, since scaled candidate projection distributions of an image are checked, rather than using a scaled image directly, it is possible to achieve a dramatic reduction in the quantity of calculations performed in determining the zoom rates. Therefore, if the CPU has about 100 mips performance, this processing can be done thirty times or more in 1 second, and this makes it possible to realize the super high resolution image processing of the invention in real time.

As mentioned above, the reason why the zoom rate is preferably detected on the basis of both the vertical projection distribution and a horizontal projection distribution is that an error in determining the zoom rate is less likely. An error may be potentially caused by the movement of an object which is resolved in the vertical direction only or the horizontal direction only. For example, when a scene is being recorded as a series of images shows a door that is open which is then shut, the zoom direction determined by using the vertical projection distribution results in a determination of zoom in when the door is "open". On the other hand, the zoom direction is determined to be zoom out when the door is "shut". In contrast, according to the horizontal projection distribution, the zoom is determined to be still, which is correct. Therefore, an accurate zoom prediction is made using both the horizontal and vertical projection distributions and selecting the one among all of the candidates that has the best match as a result of the comparison.

Incidentally, the distribution of projection of an image is found by normalizing. Normalizing in the vertical direction means to sum the intensity values of the pixels in each column of height H and divide that sum by the number of pixels for the column; and normalizing in the horizontal direction means to sum the intensity values of the pixels in each row W and divide the sum by the number of pixels in the row. This type of normalizing allows the invention to be applicable to different image sensors, since the array of pixels to be processed can be made variable, and therefore can vary between the typical number for a digital camera which is 320×240 up to a typical format of 640×480 without requiring fundamental differences in the processing techniques.

Since the intensity value of a pixel is a combination of the degrees of intensity for red, green and blue, it is at times convenient to use an approximation of the intensity value, by using only the intensity value of green, for example. The intensity value of green is approximately equal to the intensity of the pixel and can be used as the intensity value. However, it is preferred that the intensity value be calculated from the RGB values when practical.

Figure 8:
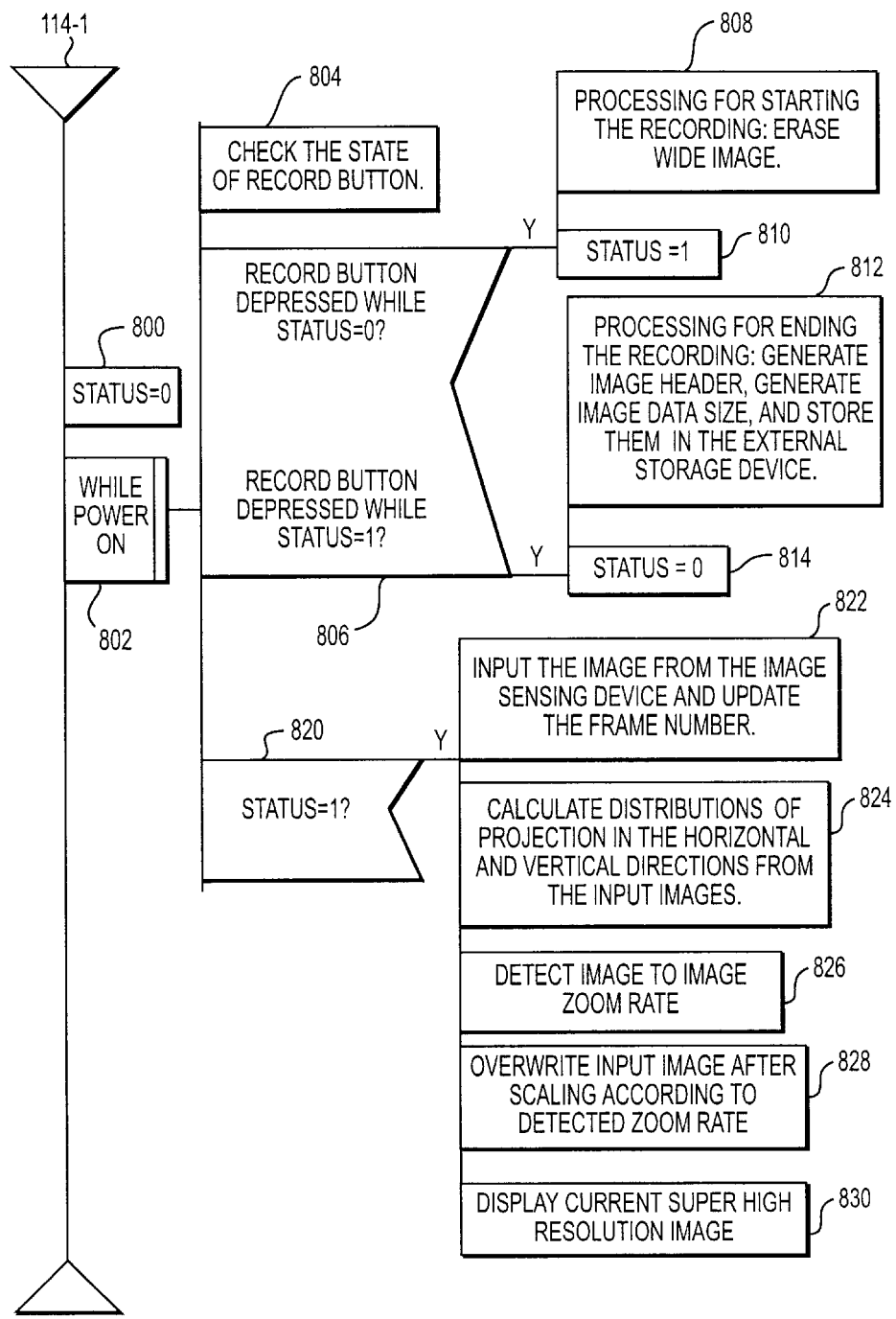
FIG. 8 shows an example of the flowchart of a camera control program.
Figure 9:
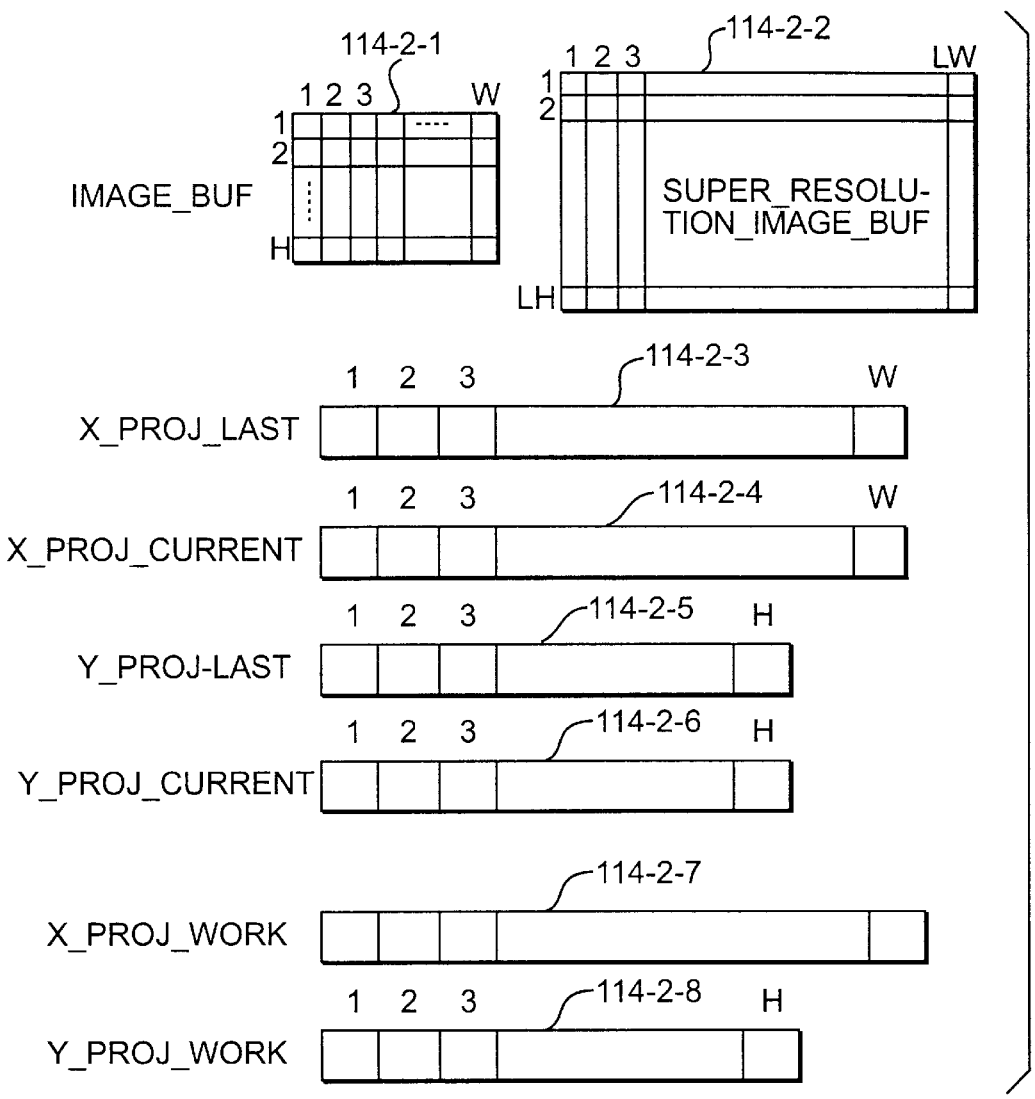
FIG. 9 is a diagram of image buffers and data structures for forming a super high resolution image according to the present invention.

FIG. 8 shows an example of camera control program 114-1 of this invention. This program flowchart shows mainly the process of generating a super high resolution image during the recording of a sequence of images. Of course, previously recorded and stored images can be processed in the same manner. Additionally, the program can include processes for editing the accumulated image, referencing the image and communicating the image, etc. Camera control program 114-1 is executed by referring to control data 114-2 that is shown in FIG. 9.

Step 800 is directed to initialization processing, wherein the variable STATUS is reset to 0. While the power of the camera is on (step 802), the following steps are followed in processing the images captured by the recording system for generating a super high resolution image.

First, in step 804, it is examined whether record button 202 has been pressed. If so, the flow moves to step 806, wherein the status is determined to be either 1 or 0 when the record button was pressed. When the record button has been pressed and the STATUS is 0, the start of recording processing 808 is executed. Here, the preceding super high resolution image displayed on display 120 of the camera is deleted for preparation of the display of a new super high resolution image. That is, SUPER_RESOLUTION_IMAGE_BUF (super high resolution image buffer) 114-2-2 (FIG. 9) is initialized.

Next, the variable STATUS is set to 1 at step 810 to effect the recording. When it is determined in step 806 that the record button has been pressed with the STATUS being set to 1, on the other hand, a determination that the recording has ended is made and the processing 812 is executed to create header information for each image (frame), to evaluate the size of the image data and to store the images in storage. Here, the image header 110-1-1 and image data size 110-1-3 of the images are written in a predetermined place in the image data structure 110-1. Next, the STATUS is reset to 0 at step 814 since the recording has ended.

Although all of the images captured during recording can be stored and processed, the images can also be processed in real time as they are being recorded, wherein the images are stored in image buffer 114-2-1, one at a time for processing and then scaled and overwritten into image buffer 114-2-2 as each new image is written into the image buffer 114-2-1.

While the power is on, the status is checked in step 820 to determine whether the status is 1 or not. When the status is 1 because of recording, the following processing is executed for the images input from the image pick up device. At step 822, the image is input through the image sensing device 102 and the image compression encoder 104, and is stored in the IMAGE_BUF 114-2-1 of the memory 114, whereby the frame number is incremented by 1. Next, at step 824, the projection distribution in the vertical and horizontal directions are calculated from the input image 114-2-1. The above-mentioned distributions of projection are stored in X_PROJ_CURRENT 114-2-4 and in Y_PROJ_CURRENT 114-2-6 of FIG. 9, respectively. The distributions of projection are stored until the next frame or image is input. In such a case, the distributions are moved to X_PROJ_LAST 114-2-3 and to Y_PROJ_LAST 114-2-5, respectively. When yet a further frame is input, they are discarded.

At step 826, the distribution of projection of the preceding frame is collated with the distribution of projection of the current frame to calculate the zoom rate. This processing will be described later in detail with reference to FIG. 10.

At step 828, a current input image is scaled according to a detected zoom rate between a last one in the series of images being processed and the current image, and the scaled current image is overwritten on image buffer SUPER_RESOLUTION_IMAGE_BUF 114-2-2.

In performing step 828, it is necessary to know the appropriate scaling factor z, which is related to the frame to frame or image to image zoom rate, as follows.

$$z_n = z_{n-1}(1/z_{bx})$$

where n is the number of images in the series of images being processed and $z_{bx}$ is the frame to frame zoom rate between adjacent or time sequential images in the series of images being processed. Incidentally, the zoom rate is defined here by a ratio that expresses how much the size of an image changes between two adjacent images, as determined by the number of pixels which consecutively processed images expand or contract with respect to one another.

Since the part of the image buffer corresponding to the center portion of the series of images being processed is overwritten each time a next succeeding image in the series is written to the image buffer 114-2-2, it is quicker to overwrite only a peripheral edge portion of each succeeding image, rather than the entire image. To perform this overwriting function according to the preferred embodiment of the invention, a variable sized center portion of each succeeding image is masked to alleviate the need for overwriting the center portion of the image to the center portion of the image buffer unless necessary to finish the image processing as when writing the first or last image of the series. This causes the processing speed to increase significantly.

At step 830, the image in SUPER_RESOLUTION_IMAGE_BUF 114-2-2 is transmitted to video memory 116, and a super high resolution image is displayed on display 120.

At the time of transfer, the content in the SUPER_RESOLUTION_IMAGE_BUF 114-2-2 may be displayed after being thinned out (selective pixel deletion) according to the resolution of the display 120. A display having a high resolution is generally expensive, therefore the display generally has a lower resolution capability than the super high resolution image and the image must be processed to display it on a display with lower resolution. However, by preserving the contents of the SUPER_RESOLUTION_IMAGE_BUF 114-2-2 as it is, it is possible to display and print the image with high resolution through another display device or printer.

Next, with reference to FIG. 10, an example of the detection of the zoom rate used in forming the super high resolution image of the preferred embodiment of the present invention will be described.

In step 1000, a zoom rate is detected from a vertical projection distribution and the determined value is set as variable ZOOM_X. The details of this processing are explained with reference to FIG. 11. Next, at step 1100 a zoom rate is determined from the horizontal projection distribution and the determined zoom rate is set as variable ZOOM_Y. The details of this processing are explained with reference to FIG. 12.

At first, it is unknown what the classification of the zoom rate is among the 3 possible cases or classes, i.e. 1.0 (still picture), greater than 1.0 (increase in zoom rate or zoom in), or less than 1.0 (decrease in zoom rate or zoom out). Accordingly, in step 1200, a determination is made as to whether the zoom function is zoom in (ZOOM_X>1.001 and ZOOM_Y>1.001), zoom out (ZOOM_X<0.999 and ZOOM_Y<0.999) or still (ELSE). Accordingly, the direction of zoom is classified into one of these three classes. The zoom direction is determined to be zoom in when both ZOOM_X and ZOOM_Y exceed 1.001.

The reason why 1.001 is used instead of 1.0 is that an additional tolerance of, for example, 0.001 is given for avoiding an erroneous determination of the still class. The tolerance is given according to the size of the image, or the speed of camera operation, etc. This suppresses mistaken determinations that might otherwise arise due to image fluctuation caused by movement of an object in the scene being recorded, etc.

The zoom direction is determined to be zoom out if both ZOOM_X and ZOOM_Y are less than 0.999, which is a value also predetermined in consideration of a tolerance factor. In case the result is not one of the above mentioned conditions, the zoom direction is determined to be neither zoom in or zoom out and therefore the still class is determined.

After a determination of zoom out or zoom in has been made, the zoom rate ZOOM is assigned the value of either ZOOM_X or ZOOM_Y in an appropriate one of steps 1202, 1203, 1205 and 1206. That is, if zoom in is determined in step 1200, then in step 1201 the value of MINVAL_X is compared with MINVAL_Y. As a result of the comparison, the value of ZOOM_X is selected as ZOOM if MINVAL_X is less than MINVAL_Y (step 1202) and the value of ZOOM_Y is selected as the zoom rate if MINVAL_X is greater than MINVAL_Y (step 1203). In this way, the smaller one of MINVAL_X and MINVAL_Y is selected, which indicates the least error resulting from the comparison, and is set as the value for the variable ZOOM, which becomes the zoom rate between images.

A similar series of determinations are performed after it is determined that the zoom direction is zoom out in steps 1204, 1205 and 1206. In the case of a still zoom rate determination, 1.0 is set as the variable ZOOM at step 1207.

Figure 11:
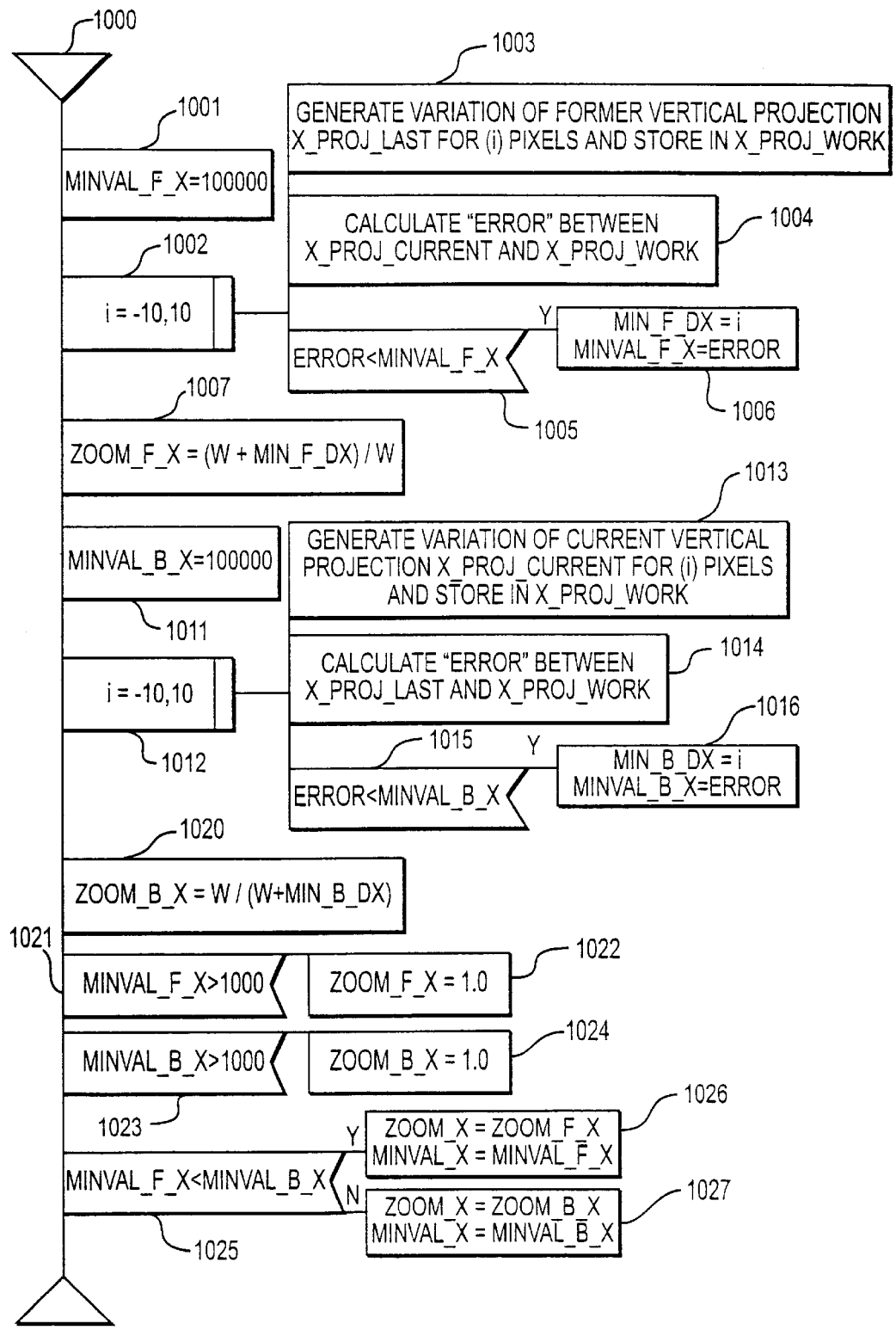
FIG. 11 shows an example of the flowchart of a process of detecting a zoom rate between sequential images from vertical projection distributions of the images.
Figure 12:
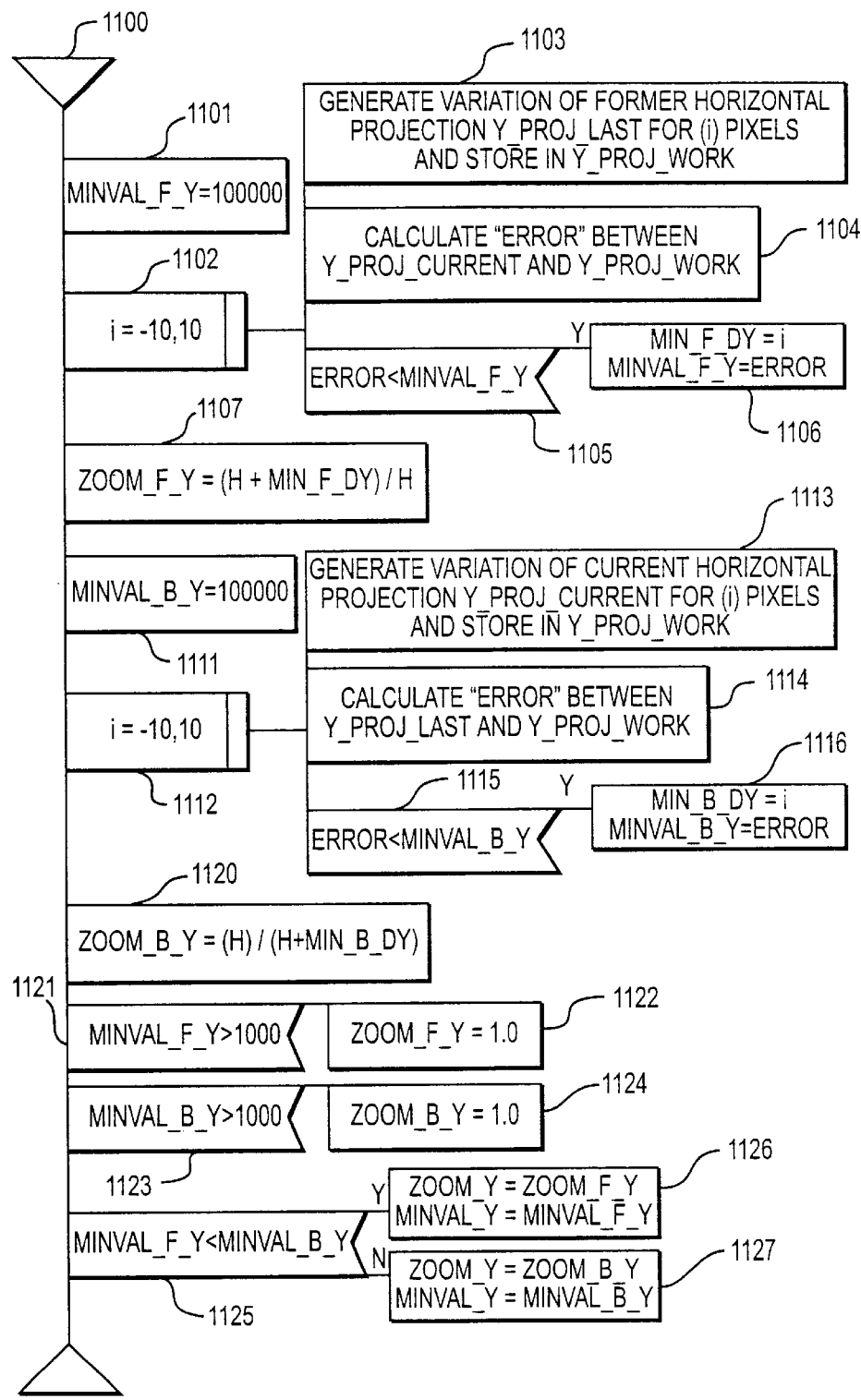
FIG. 12 shows an example of the flowchart for a process of detecting a zoom rate between sequential images from horizontal projection distributions of the images.

FIG. 11 shows the details of a process of detecting ZOOM_X and MINVAL_X from the vertical projection distribution using both forward and backward prediction; and FIG. 12 shows the details of a process of detecting ZOOM_Y and MINVAL_Y from the horizontal projection distribution also using both forward and backward prediction used in determining the zoom rate. A detailed description of FIG. 11 follows with the understanding that the description of FIG. 12 is the same, except for the difference with respect to the use of vertical projection distributions in FIG. 11 and horizontal projection distributions in FIG. 12. In each of the figures, "F" refers to forward prediction and "B" refers to backward prediction.

Figure 10:
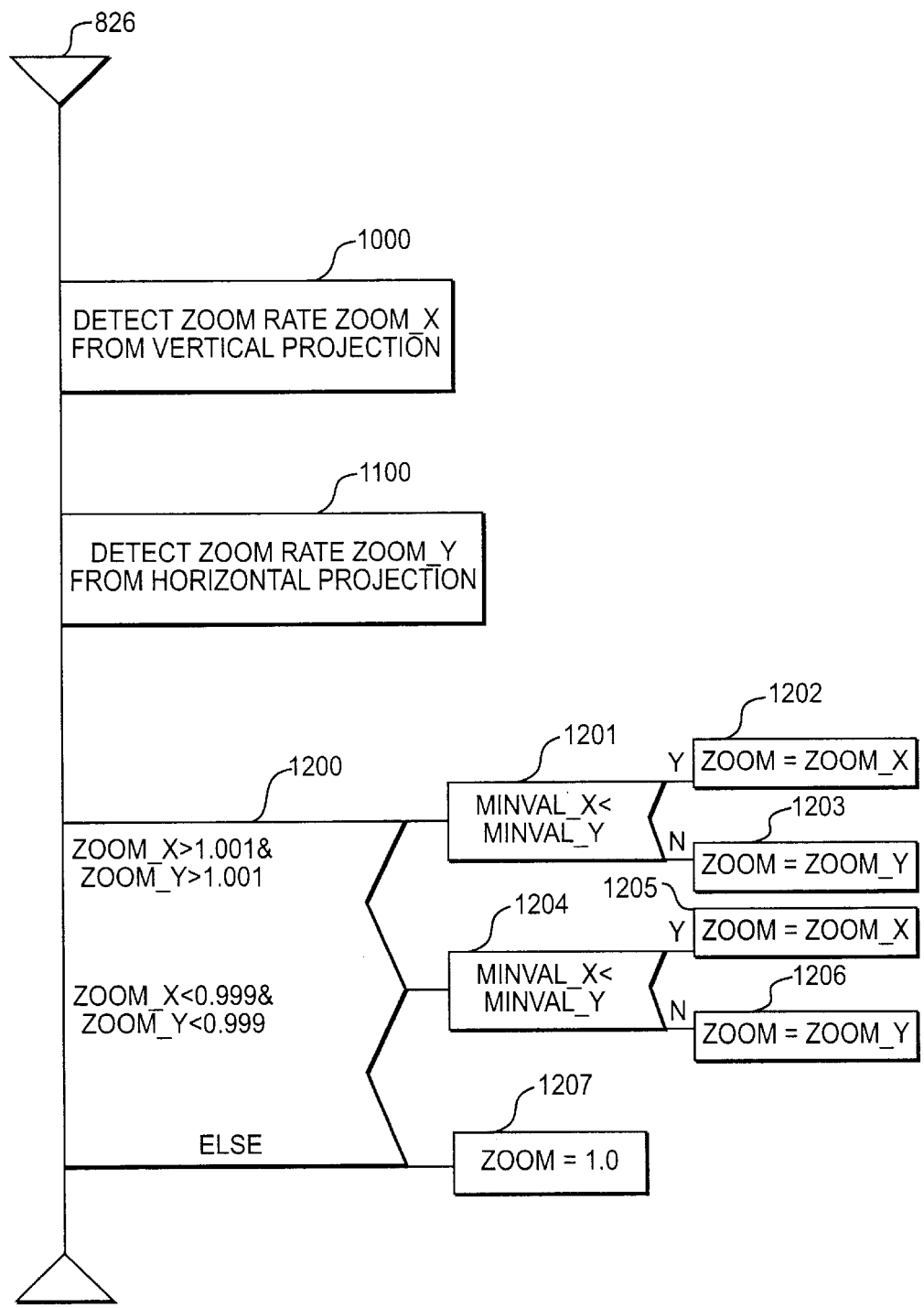
FIG. 10 shows an example of zoom rate detection between images for generating super high resolution image.

In particular, FIG. 11 shows the details of determining ZOOM_X in step 1000, shown in FIG. 10. At step 1001, variable MINVAL_F_X that stores a check error at the time of doing a forward prediction is set to a sufficiently large value, theoretically infinitely large, but practically a large value that exceeds the maximum possible value of the variable.

At step 1002, the range that is supposed is set as a variable "i" since the fluctuation range of the zoom rate between continuous images is limited. In this example, the size of fluctuation in the image size (sight) is based on a range from −10 pixels to +10 pixels with respect to the overall pixel width dimension of an image.

At step 1003, by using the projection distribution of a former frame stored in X_PROJ_LAST 114-2-3, a projection distribution when the size of a sight fluctuates by (i) pixels is generated and is stored in X_PROJ_WORK (temporary vertical projection distribution arrangement) 114-2-7.

Since the original projection distribution is scaled in the direction of a one-dimensional projection axis, the temporary projection distribution can be calculated at high speed. Next, a check is made between the projection distribution of a present frame stored in the X_PROJ_CURRENT 114-2-6 and a temporary projection distribution stored in X_PROJ_WORK 114-2-7, and a difference error at the time of checking is stored as a variable ERROR (step 1004).

At step 1005, the value of ERROR and MINVAL_F_X is compared, and when the ERROR is less than MINVAL_F_X, MIN_F_DX is set to variable i, and the value of ERROR is substituted for MINVAL_F_X (Step 1006).

By repeating the above process, when variable MIN_F_DX becomes i, variable MINVAL_F_X is calculated. At step 1007, by using the value of above variable MIN_F_DX, the zoom rate of a forward prediction is calculated and is stored as variable ZOOM_F_X.

In the foregoing, it is assumed that the width of an image is W, and accordingly the zoom rate for forward prediction is calculated by (W+MIN_F_DX)/W.

Step 1011 is similar to step 1001 and the procedure of steps 1012-1016 and 1020 are also similar to steps 1002-1007, except that these latter steps are directed to backward prediction of the zoom rate. First, variable MINVAL_B_X is set to a sufficiently high value (step 1010), and at step 1012, the fluctuation range that is supposed is set to variable i. In this part of the flow, the size of fluctuation in the image size (sight) is also based on a range from -10 pixels to +10 pixels with respect to the overall pixel width dimension of an image.

At step 1013, by using the projection distribution of a present frame stored in X_PROJ_CURRENT 114-2-4, a projection distribution when the size of a sight fluctuates by i pixels is generated and is stored in buffer X_PROJ_WORK (temporary vertical projection distribution arrangement) 114-2-7.

Next, a check is made between a projection distribution of a former frame stored in buffer X_PROJ_LAST 114-2-3 and a temporary projection distribution stored in buffer X_PROJ_WORK 114-2-7, and a difference error resulting from the check at the time is stored in variable ERROR.

At step 1015, the value of ERROR and MINVAL_B_X is compared, and when the ERROR is less than MINVAL_B_X, MIN_B_DX is set to variable i, and the value of ERROR is substituted for MINVAL_B_X (Step 1016). By repeating the above process, when variable MIN_B_DX becomes i, variable MINVAL_B_X is calculated. At step 1020, by using the value of the above variable MIN_B_DX, the zoom rate of a backward prediction is calculated and is stored as variable ZOOM_B_X.

The zoom rate for backward prediction is calculated by evaluating the expression W/(W+MIN_B_DX).

In steps 1021 to 1024, MINVAL_F_X and MINVAL_B_X are checked to determine if each is greater than a threshold, and if so, the reliability of the zoom detection is judged to be a bad result, and ZOOM_B_X and ZOOM F X are each assigned the default value of 1.0.

At step 1025, MINVAL_F_X and MINVAL_B_X are compared and at step 1026 or 1027, the zoom prediction value of the smaller one is stored in variable ZOOM_X and the corresponding one of MINVAL_F_X and MINVAL_F_Y is stored as the variable MINVAL_X. Variable MINVAL_X is consequently based on whichever of the forward prediction or backward prediction that is determined to be more accurate and then is compared with MINVAL_Y in steps 1201 and 1204, as explained with reference to FIG. 10.

In FIG. 12, steps 1100–1127 respectively correspond to steps 1000–1027, as explained above, so further explanation of the corresponding steps in FIG. 12 is unnecessary, except with respect to the following differences.

In FIG. 12, at step 1102, the range that is supposed is set as a variable "i" representing the size of fluctuation in the image size (sight) based on a range from -10 pixels to +10 pixels with respect to the overall pixel height dimension of an image. Further, since the zoom rate determination in FIG. 12 is based on horizontal distribution projections, the zoom rate is calculated assuming an image of height H, by evaluating the expression (H+MIN_F_DY)/H in step 1107 (forward prediction) or H/(H+MIN_B_DY) in step 1120 (backward prediction).

The result of the flow in FIG. 12 is the detection of ZOOM_Y and MINVAL_Y, which are used in steps 1200-1206, shown in FIG. 10.

Figure 7A:
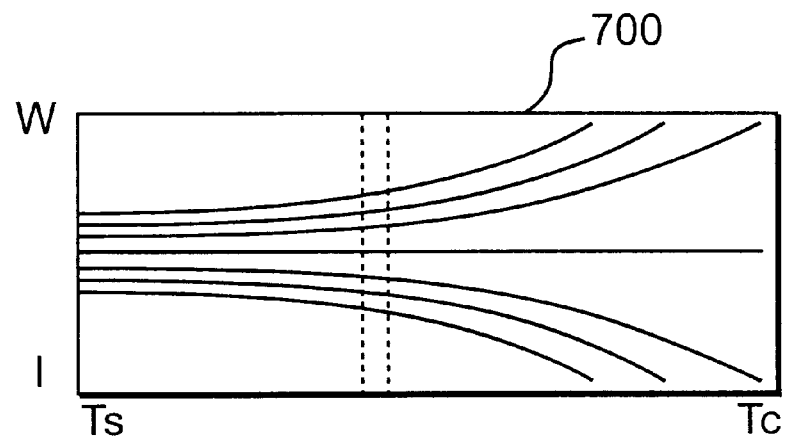
FIGS. 7A and 7B are examples of graphical interfaces for users that displays a rate of zoom for a sequence of input images according to a preferred embodiment of the invention.
Figure 7B:
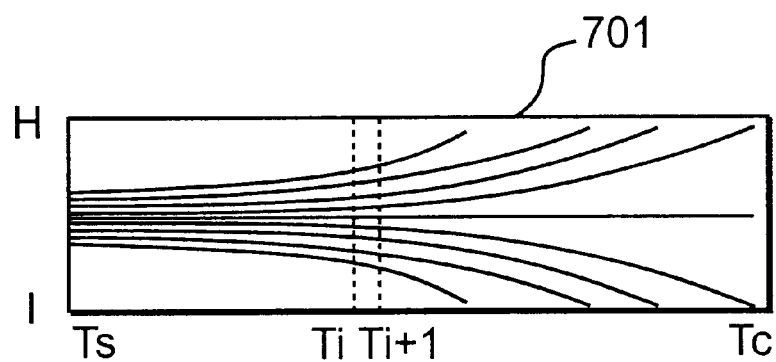

An example of a graphical user interface that displays graphic information related to the camera's zoom operation on display 120 is shown in FIGS. 7A and 7B. Vertical projection distribution 700 and horizontal projection distribution 701 are displayed graphically in time transition by setting a horizontal axis to represent photographing time from the start of recording Ts to the end of recording Te, and a vertical axis to represent projection position.

This is obtained by translating the value of each vertical projection distribution 501 and horizontal projection distribution 500 in FIG. 5 into a gradation of shades and displaying one line vertically according to each frame.

FIGS. 7A and 7B show an example of the transition that occurs for the projection distributions of a time series in the case of photographing using the zoom in function. By displaying such a transition on display 120 (FIGS. 2B and 2C, for example), a user can easily understand the camera's zoom operation.

When the camera's operation is different from that expected by the user's experience, a different pattern appears. For example, in the case of a still operation, a pattern that is parallel to the horizontal axis appears. Accordingly, the operator is immediately apprised of the difference. Moreover, in the case of pan, an inclined pattern that has a constant angle in the horizontal axis appears.

The preferred embodiment of the invention shows a super high resolution camera that generates a high resolution image at the center of screen by using the camera's operation of zooming in or zooming out.

It is possible to generate an image that has a high resolution not only in the center of an image but also in another targeted area by combining a pan or tilt operation with zoom. For example, as shown in FIG. 3, when a pan operation is done, by overwriting an image obtained by the pan operation on an image at the time Te, it is possible to generate an image with high resolution in a broader area.

In addition, for the case where both the zoom operation and the pan operation are performed, it is possible to generate a high resolution image. In this case, a high resolution image is generated by predicting a shift of position in addition to predicting a zoom rate.

The camera of this invention is not limited to the camera body embodiment shown in FIG. 2A. Of course, it is possible to connect a video camera that enables the photographing of a moving image to a digital computer such as a personal computer, to perform a process like the above mentioned one for an image taken from the video camera, and display the high resolution image on a display of the digital computer.

In this case, a digital computer can store the camera program 114-1 on recording media for controlling the processing of images to obtain a super high resolution image. The program can be stored on magnetic disk, optical disk, etc. or provided through a network connection to which a digital computer is connected. In such a case, the program would be supplied to a digital computer, and the digital computer would read a program for generating a super high resolution image from the recording medium to the main memory.

It is possible that the resolution of a super high resolution image display is higher than that of the resolution of the image pickup device.

This invention provides a super high resolution camera that is able to obtain a still image with wide angle and high resolution comparable to that obtained with a wide angle film camera with low cost, high efficiency, and in real time. Furthermore, the situation of creating a super high resolution image is confirmed on the display momentarily so as to provide immediate feedback to the user for preventing errors in the photography. In addition, the image can be transmitted to a computer, and it is possible to watch it as a high resolution image by a high resolution printer or a high resolution display.

While preferred embodiments have been set forth with specific details, further embodiments, modifications and variations are contemplated according to the broader aspects of the present invention, all as determined by the spirit and scope of the following claims.

We claim:

1. A digital camera, comprising:
    a viewer for viewing an image to be projected on an image sensing device;
    an optical system through which an image is projected on an image sensing device to take a plurality of images of a scene, having a zooming system;
    an input device for starting and ending recording of the plurality of images;
    a processor that consecutively receives said plurality of images and scales each image according to an image to image zoom rate between each of said images; and
    an image display that displays a super high resolution image in real time, wherein said processor includes zoom rate detection means for a pixel intensity value projection distribution determining and storage means for storing distributions of projection in pixel intensity in horizontal and vertical directions of the current and previous images, and a means for detecting a fractional shift in image width and height among consecutive images of the plurality of images due to movement of the zooming system during the recording.

2. A digital camera according to claim 1, further including an image display buffer which said processor writes each said consecutive image to after scaling each said image, wherein said display receives an output from said buffer to display said super high resolution image in real time.

3. A digital camera according to claim 1, further including an image storage means for storing at least one said super high resolution image.

4. A storage medium wherein a computer program for forming a high resolution image is stored, said computer program including:
    a step for reading out a series of images taken by a camera;
    a step for detecting a zoom rate between two of said series of images using distribution of projection in pixel intensity in horizontal and vertical directions of said two images;
    a step for scaling a current one of said two images with respect to a previous one of said two images in accordance with said zoom rate;
    a step of overwriting each said current image on image overwritten previously to generate a high resolution image; and
    a step of displaying said high resolution image on a display.

5. A storage medium according to claim 4, wherein said stored computer program further includes a step of outputting a super high resolution image during recording to display a super high resolution image in progress on said display in real time.

6. A storage medium according to claim 4, wherein said stored computer program further includes a step of determining said distribution of projection in pixel intensity by normalizing results of integration of intensity values of pixels constituting an image in the horizontal direction and the vertical direction, respectively, with respect to a number of pixels in the integration.

7. A storage medium according to claim 4, wherein said stored computer program further includes a step of determining an image to image zoom rate between said previous image and said current image using forward prediction and backward prediction wherein a least error result of one of the forward and backward prediction of the image to image zoom rate is selected as said zoom rate.

8. A storage medium according to claim 4, wherein said stored computer program further includes a step of determining one of zoom in, zoom out and still as a condition of the movement of a zooming system during recording before determining an image to image zoom rate between said two images.

9. A computer program for forming a high resolution image, said computer program including:
    a step for reading out a series of images taken by a camera;
    a step for detecting a zoom rate between two of said series of images using distribution of projection in pixel intensity in horizontal and vertical directions of said two images;
    a step for scaling a current one of said two images with respect to a previous one of said two images in accordance with said zoom rate;
    a step of overwriting each said current image on image overwritten previously to generate a high resolution image; and
    a step of displaying said high resolution image on a display.

10. A computer program according to claim 9, wherein said computer program further includes a step of outputting a super high resolution image during recording to display a super high resolution image in progress on said display in real time.

11. A computer program according to claim 9, wherein said computer program further includes a step of determining said distribution of projection in pixel intensity by normalizing results of integration of intensity values of pixels constituting an image in the horizontal direction and the vertical direction, respectively, with respect to a number of pixels in the integration.

12. A computer program according to claim 9, wherein said computer program further includes a step of determining an image to image zoom rate between said previous image and said current image using forward prediction and backward prediction wherein a least error result of one of the forward and backward prediction of the image to image zoom rate is selected as said zoom rate.

13. A computer program according to claim 9, wherein said computer further includes a step of determining one of zoom in, zoom out and still as a condition of movement of zooming during recording before determining an image to image zoom rate between said two images.

14. A data processing apparatus for forming a high resolution image, said data processing apparatus executing the steps of:
    reading out a series of images taken by a camera;
    detecting a zoom rate between two of said series of images using distribution of projection in pixel intensity in horizontal and vertical directions of said two images;

scaling a current one of said two images with respect to a previous one of said two images in accordance with said zoom rate;

overwriting each said current image on image overwritten previously to generate a high resolution image; and displaying said high resolution image on a display.

15. A data processing apparatus according to claim 14, said data processing apparatus further executing the step of outputting a super high resolution image during said recording to display a super high resolution image in progress on said display in real time.

16. A data processing apparatus according to claim 14, said data processing apparatus further executing the step of determining said distribution of projection in pixel intensity by normalizing results of integration of intensity values of pixels constituting an image in the horizontal direction and the vertical direction, respectively, with respect to a number of pixels in the integration.

17. A data processing apparatus according to claim 14, said data processing apparatus further executing the step of determining an image to image zoom rate between said previous image and said current image using forward prediction and backward prediction wherein a least error result of one of the forward and backward prediction of the image to image zoom rate is selected as said zoom rate.

18. A data processing apparatus according to claim 14, said data processing apparatus further executing the step of determining one of zoom in, zoom out and still as a condition movement of zooming during recording before determining an image to image zoom rate between said two images.

19. A storage medium according to claim 4, wherein the step for detecting a zoom rate includes:

a step for generating a plurality of hypothetical distributions of projection in pixel intensity of one of the images, and a step for comparing the hypothetical distributions of projection in pixel intensity with the distribution of projection in pixel intensity of another one of the images.

20. A computer program according to claim 9, wherein the step for detecting a zoom rate includes:

a step for generating a plurality of hypothetical distributions of projection in pixel intensity of one of the images, and a step for comparing the hypothetical distributions of projection in pixel intensity with the distribution of projection in pixel intensity of another one of the images.

* * * * *